Oct. 30, 1923.

E. J. APPLEBERG 1,472,263

AUTOMATIC CHANGE GEAR

Filed April 23, 1921    4 Sheets-Sheet 2

Inventor:
Edwin J. Appleberg
By Daniel Brennan.
Attorney.

Oct. 30, 1923.
E. J. APPLEBERG
AUTOMATIC CHANGE GEAR
Filed April 23, 1921
1,472,263
4 Sheets-Sheet 3
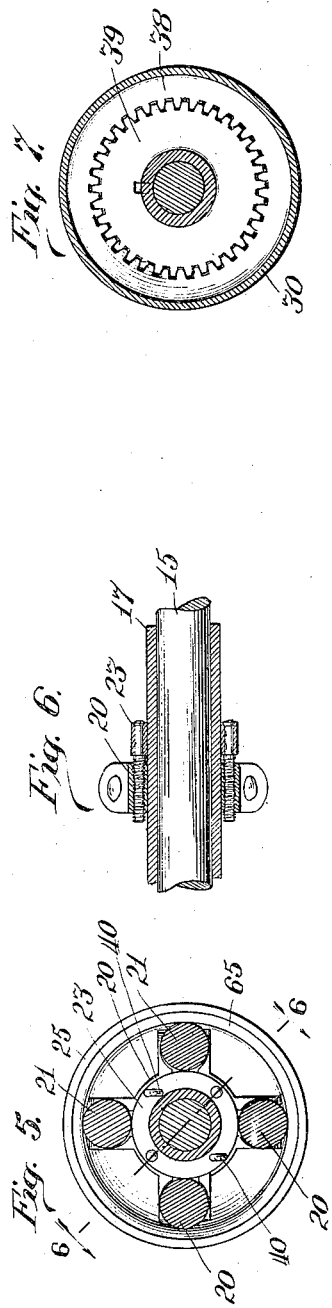
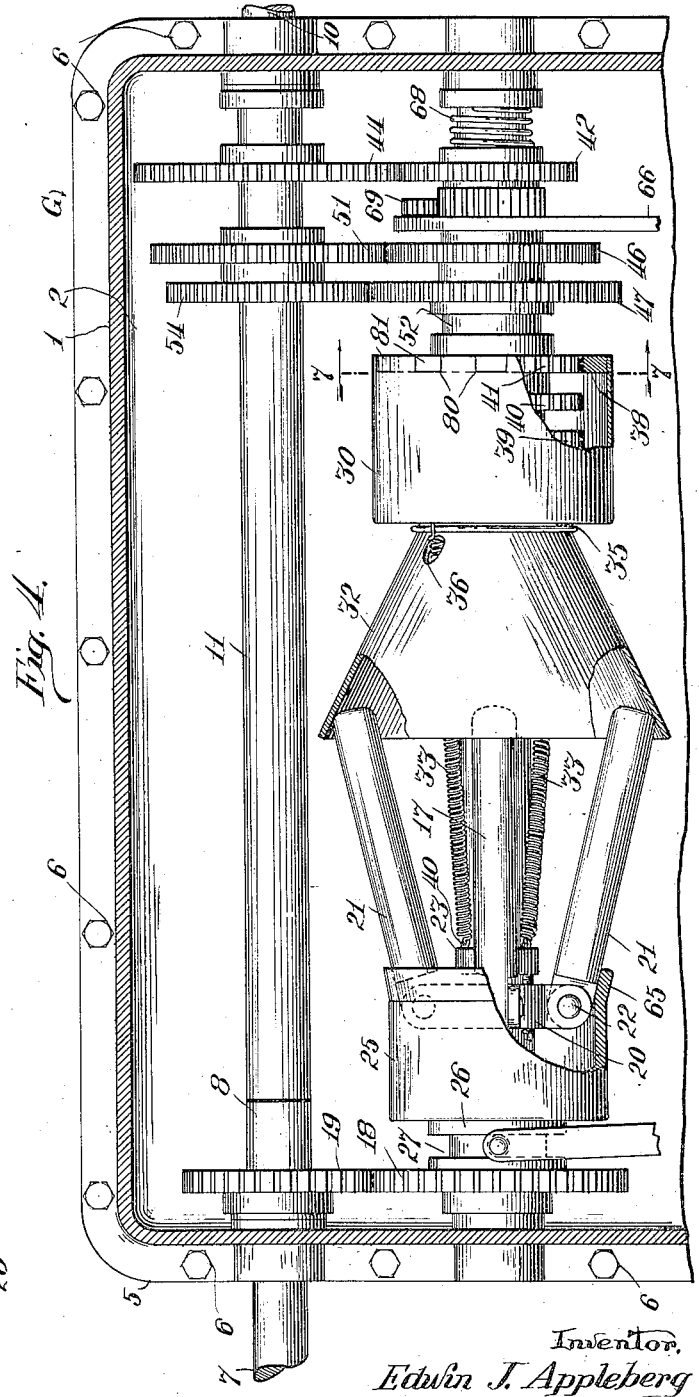
Inventor,
Edwin J. Appleberg
By
Daniel J. Brennan.
Attorney.

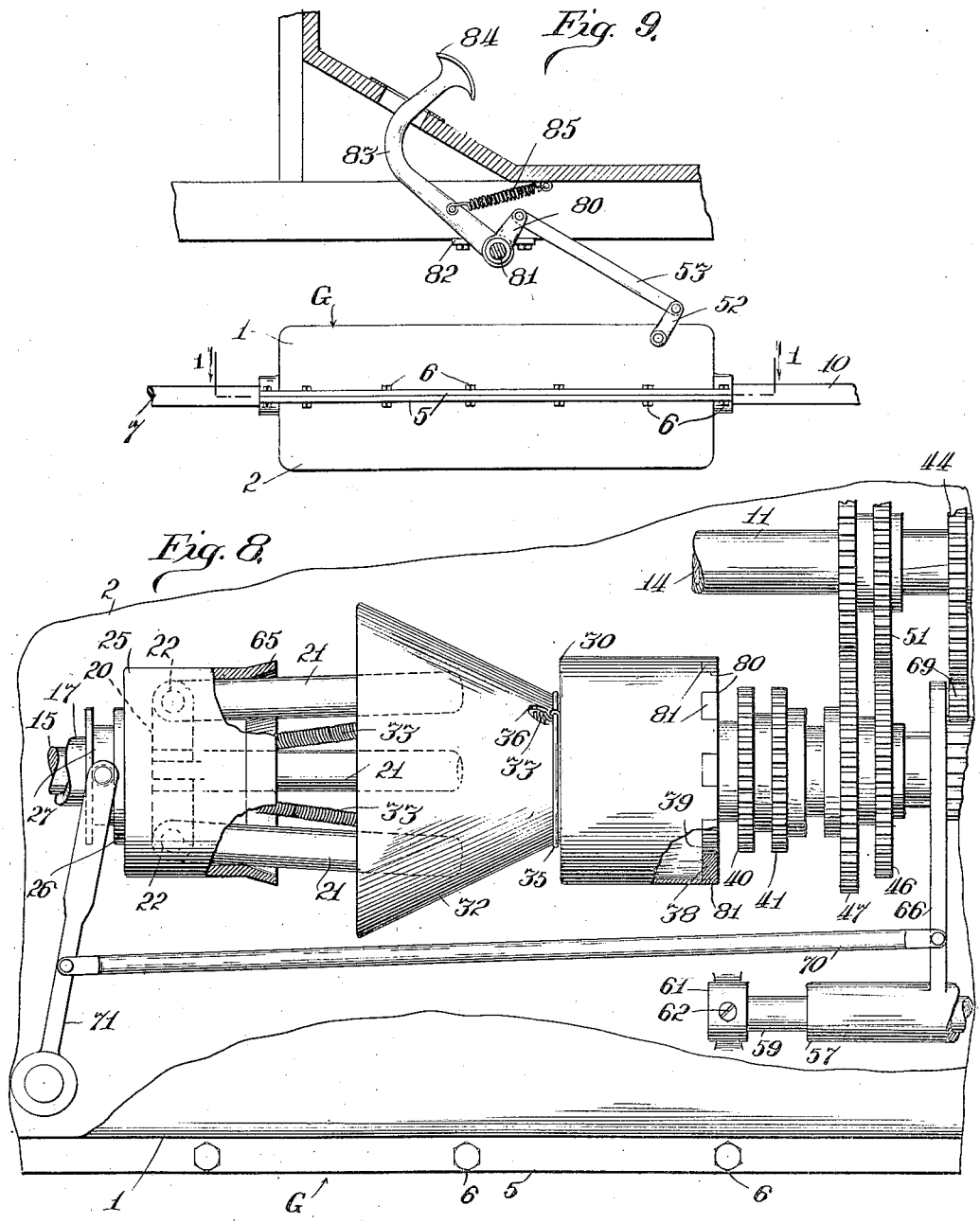

Patented Oct. 30, 1923.

1,472,263

UNITED STATES PATENT OFFICE.

EDWIN J. APPLEBERG, OF CHICAGO, ILLINOIS.

AUTOMATIC CHANGE GEAR.

Application filed April 23, 1921. Serial No. 464,019.

*To all whom it may concern:*

Be it known that I, EDWIN J. APPLEBERG, a citizen of the United States, residing at Chicago, county of Cook, and State of Illinois, have invented a new and useful Improvement in Automatic Change Gears, of which the following is a specification.

This invention relates to improvements in automatic change speed gears for motor vehicles and the like.

It is an object of the invention to provide a change speed gear of this kind, wherein, dependent upon a variation in the speed of the main or engine shaft, different sets of transmission gears are thrown in or out of operation respectively so as to vary the speed of the vehicle itself.

It is also an object of the invention to provide in combination with means for varying the vehicle speed in accordance with the engine speed elements or members which are subject to centrifugal force and change their position in accordance therewith to influence by this change of position the speed of the vehicle.

It is also an object of the invention to provide a conical sleeve upon which movable fingers or members which are under the influence of the centrifugal force act, in order to produce by their movement in radial direction a movement of the sleeve in axial direction, said sleeve being the controlling element for a plurality of gear sets.

It is also an object of the invention to combine with an automatic speed gear of this kind means for reversing the direction of travel of the motor car without necessitating a reversion of the direction in which the engine is being driven, and to prevent this travel of the motor car in opposite direction at the speed different from the lowest speed at which the engine may drive the car forward.

With these and numerous other objects in view an embodiment of the invention is described in the following specification and illustrated in the accompanying drawings wherein—

Fig. 4 is an elevation similar to Fig. 1, some parts being in section but showing the change speed gear in high speed position;

Fig. 5 is a detail sectional view on line 5—5 of Fig. 1;

Fig. 6 is a detail section on line 6—6 of Fig. 5, and

Fig. 7 is a detail transverse section on line 7—7 of Fig. 4.

Fig. 8 is an elevation similar to Fig. 1, but showing the parts in position for the reverse drive, and Fig. 9 is a side elevation of the lever and link connection for operating the reverse mechanism.

Figure 1:
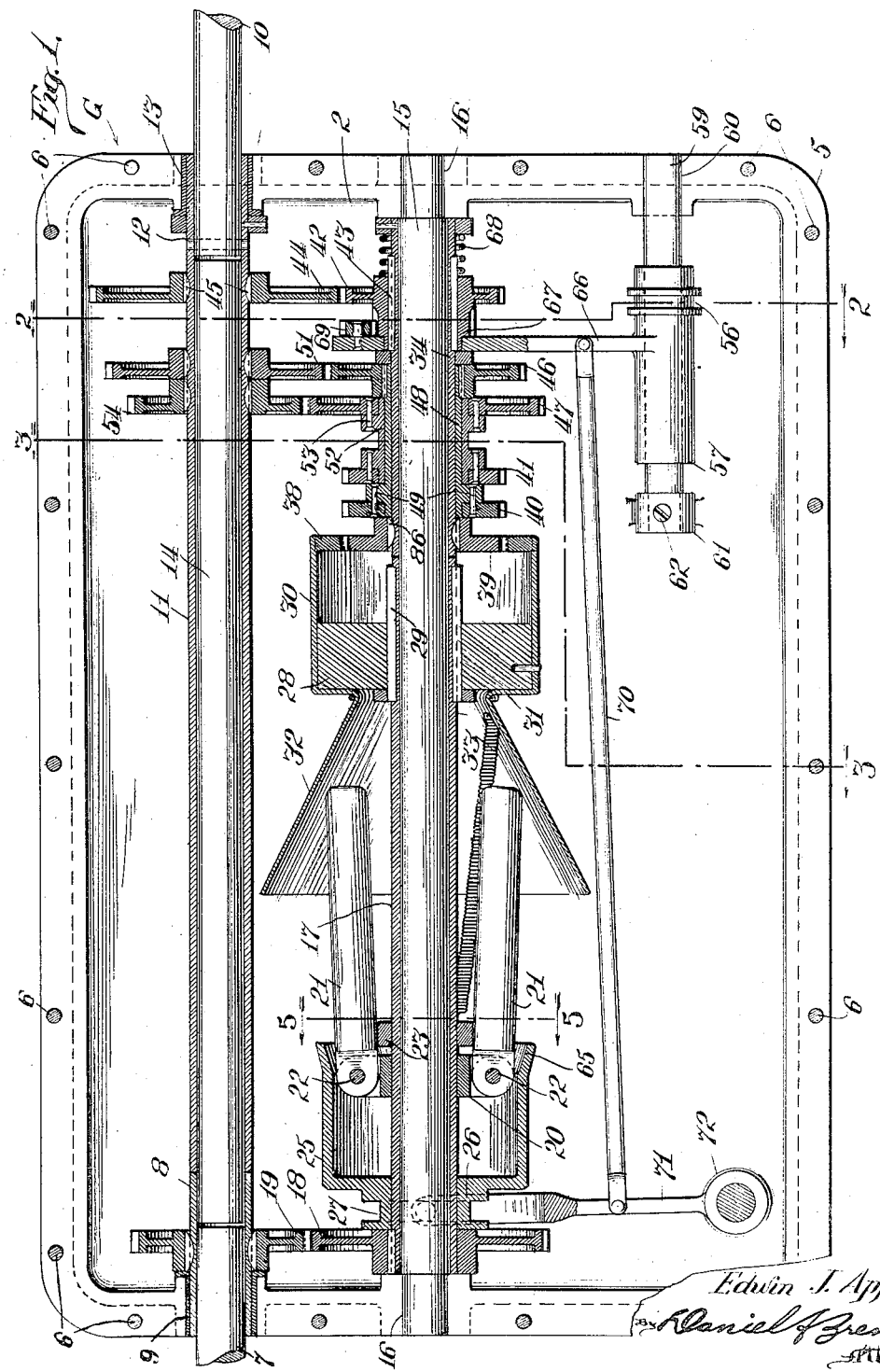
Fig. 1 is a horizontal sectional view through the gear casing, several parts being shown in elevation, the position of the parts being that of the first or low speed.
Figure 2:
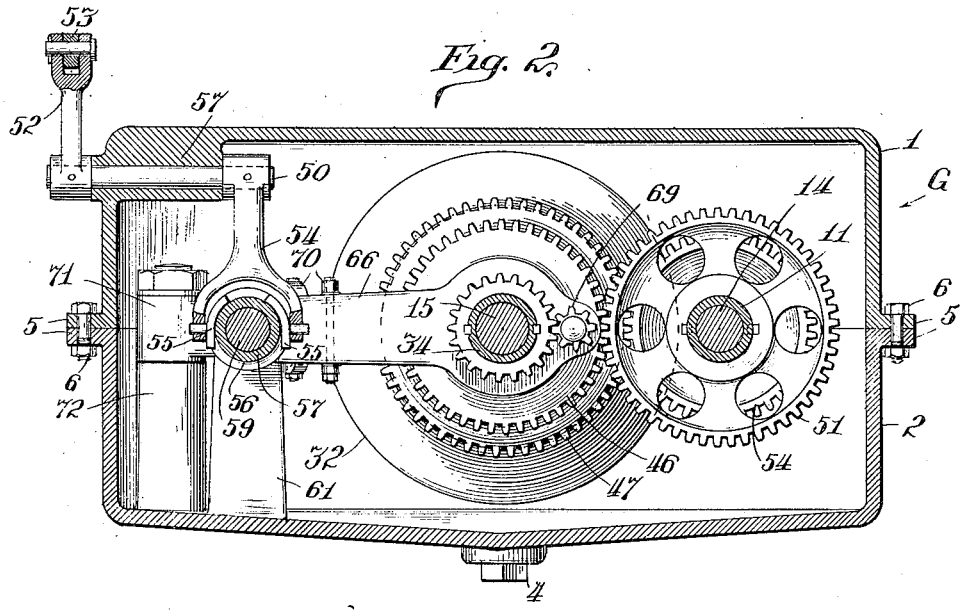
Fig. 2 is a vertical transverse section on line 2—2 of Fig. 1.

The gear casing G consists of an upper portion 1 and a lower portion 2, the latter being preferably provided with an opening at the bottom which is normally closed by a screw plug 4 to permit the withdrawal of the lubricant with which the casing may be partly filled. The two casing portions 1 and 2 are provided with preferably horizontal flanges 5 which are united by bolts 6 as indicated in Fig. 2. The two end walls of this casing are constructed to form bearings for several shafts as shown in Fig. 1.

The engine shaft 7 is surrounded within the bearing by a suitable sleeve 8, which is pinned to the shaft and which projects beyond the end of said shaft, being, however, supported in the bearing portion of the flange 5 by a journal brass 9. The driven shaft 10 is in alignment with the driving shaft 7 and for the purpose of facilitating the assembly of the parts within the casing an intermediary shaft 11 is disposed between driven shaft 10 and the driving shaft 7. This intermediary shaft 11 is constructed as a tubular shaft which is pinned to the driven shaft at 12 so as to rotate with the same and which is supported in the bearing 13 opposite the bearing 9 of the casing. In order to support this tubular shaft a solid shaft 14 is carried in the interior of the same, and projects at one end into the supporting sleeve 8 of the driving shaft. At the other end the driven shaft 10 projects approximately to the same extent into the tubular shaft 11. Owing to this arrangement of the parts the assembly or disassembly of these shafts may be effected without any difficulties, and they will be retained at the desired alignment while in operation.

An auxiliary shaft 15, extending parallel to the above described arrangement of aligned shafts, is supported in bearings 16 in the end walls of the casing, and carries a sleeve, which forms the tubular counter-shaft for the change speed gears. This tubular shaft 17 carries near one end rigidly mounted thereon a gear 18 which is in engagement with a gear 19 keyed to the sleeve 8, and which therefore is in fixed connection with the driving shaft 7.

The counter shaft 17 will be driven at a predetermined ratio of speed with respect to the driving shaft, and this ratio remains constant independent of the speed of the driving shaft.

The counter shaft 17 supports a spider 20, which is held against axial displacement and to the spokes of which the members 21 are pivotally connected at 22. The distance of the free ends of the members 21 from the axis of the shaft 17 will increase when the speed of the shaft 17 increases. The point to which the members 21 may approach the tubular shaft 17 is, however, limited by a collar 23 which is also carried by the tubular shaft adjacent the spider 20 so as to normally maintain the centrifugal members 21 in the position in which they are shown in Fig. 1.

A bell shaped member 25, being slightly enlarged at the one end, is loosely mounted on the tubular shaft 17, the bottom of this bell shaped member having a hub extension 26, which is provided with the circular groove 27 for receiving a yoke, whereby this bell shaped member may be shifted in axial direction to advance over the member 21 and thereby preventing the same from flying outwardly under the action of the centrifugal force.

At a distance from the spider 20 a disk 28 is splined on the shaft 17 by the keys 29. The circumference of this disk is firmly united with a cup or cylinder 30 having a bottom portion 31 from which a hollow cone 32 extends in direction towards the centrifugal members 21. Normally the free ends of the members 21 project into the cavity of the cone 32 which, therefore, forms a wall to confine the limit to which these members may be thrown outwardly by the centrifugal force. This conical part 32 may be displaced axially on the shaft by the pressure of the free ends of the centrifugal members 21 until the widest portion of the cone is in engagement with the said free ends. Normally, however, this cone with the cup shaped member 30 secured thereto is drawn towards the spider 20 by a plurality of springs 33, two being shown which are anchored on the ring 23 by means of screws 40, Fig. 6, which also serve for connecting this ring with the spider. In order to maintain the springs in position a ring 35 is placed around the narrow portion of the cone 32 adjacent the bottom 31 of the cup 30. The other ends of the springs are fastened to this ring, for which purpose openings 36 extend through the conical wall of the funnel, to permit the passage of the springs through the same.

The disk 28 and cone 32 being positively rotated owing to their key connection with the counter shaft 17, the rotary movement will be yieldingly transmitted through the springs 33 to the ring 23 and to the carrier 20 for the centrifugal members 21. The latter will gradually gain in momentum and press radially against the cone, and an axial component of this pressure will produce a displacement of the cone in longitudinal direction when the speed of shaft 17 increases. This axial displacement is effected against the action of the springs 33, which at all times exert a yielding resistance, and which upon decrease of speed again yieldingly return the cone to its original position. The flaring end 65 of cup 25 limits the outward movement of the members 21 as shown in Fig. 4, and thereby also the maximum displacement of the shift member 30.

The cup 30, which is rotated together with the shaft 17, is provided near its free end with a rim 38, having inwardly directed gear teeth to mesh with gears 39, 40, and 41, respectively, depending upon the displacement of the cup on the tubular shaft. The gears 39, 40, and 41 have the same diameter and number of teeth and are spaced uniformly from each other. The gear 39 is keyed at 86 to a sleeve 34 which is loosely mounted on shaft 15 and to which also a gear 42 is keyed by the spline 43. This gear may approximately have the same diameter and number of teeth as the gear 39. As long as the clutch 30, therefore, is in engagement with the gear 39 the gear 42 also will be driven at the same speed, and will transmit its rotation to a gear 44 of larger diameter, which is mounted through a key 45 on the tubular driven shaft 11 so as to communicate the rotation through this shaft to the driven solid shaft 10 in alignment therewith. The gears 40 and 41 are not mounted, however, directly on the counter shaft 17 of sleeve 34, but are in driving relation with other gears 46 and 47, as will be seen from Fig. 2. The gear 40 for this purpose is associated with a sleeve 48, which is loosely rotatable on the sleeve 34 and which is riveted at 49 to the gear 40. The other end of this sleeve 48 is keyed to a gear 46, in permanent mesh with a gear 51 of larger diameter, and rigidly secured to the counter shaft 11. In a similar way the gear 41 is fixedly connected to a sleeve 52, which is also loose on the sleeves 34 and 48, and which at its free end is riveted or connected in some other way at 53 with the larger gear 47, in driving engagement with the gear 54, also keyed to the tubular counter shaft 11. Owing to the ratios of the gears 42, 46, 47 to their cooperating gears 44, 51 and 54 respectively it is obvious that the aligned shaft 11 may be driven at different speeds. The gear 42 being considerably smaller than the gear 44 the engagement of these two gears will cause a reduction of the speed of the shafts 11 and shaft 10 as compared to the speed of the driving shaft 7. This speed, therefore, may be considered the first step or low speed. The gear 46 having about the same diameter as the gear 51 no reduction of speed will occur in the transmission between the shafts 17 and 11, while owing to the ratio between the relatively large gear 47 and relatively small gear 54 the speed of the driven shaft 11 is increased as compared with the speed of the counter shaft 17. Fig. 1 shows the elements in the driving relation for the first step of speed, while Fig. 4 shows the same parts in their driving relation for the third or highest speed. At all steps of speed the engagement of gears 42, 46, 47 with the gears 44, 51 and 54 respectively is maintained. A drive, however, only takes place when any of the gears 39, 40 or 41 is in engagement with the gear 38.

Figure 3:
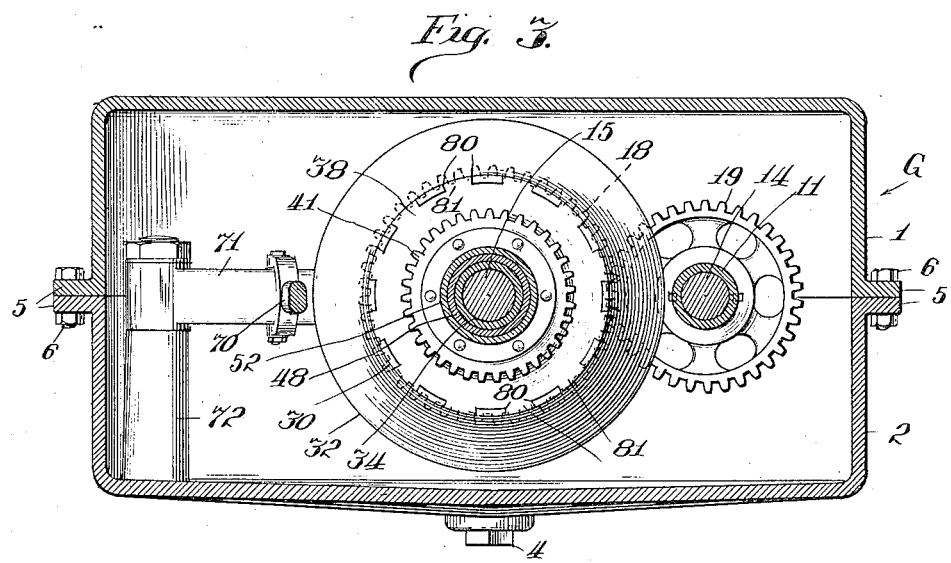
Fig. 3 is a vertical transverse section similar to Fig. 2, and taken on line 3—3 of Fig. 1.

The latter is fixed to the bell shaped member 30, as indicated at Figs. 3 and 4 by the rim of the clutch, having cut out portions 80 into which radial projections 81 of the gear 38 extend.

For the purpose of reversing the direction of drive a reverse mechanism under the control of the driver is provided. This reverse mechanism, as indicated at Figs. 1 and 2, includes a pivot pin 50 which is rotatably supported in a lug 57 on the top part 1 of the casing. The projecting outer end of this pivot pin carries an arm 52 with which a rod 53 is in pivotal engagement. This rod leads either directly or through links to the dash board where it may be associated with the pedal in some approved way.

The inner end of the pivot pin 50 is fixedly secured to a yoke 54 the arms of which have pins 55 entering a groove 56 on a sleeve 57'. This sleeve is slidable on a rod 59, one end of which is secured in a bearing 60 of the casing while the other end is carried in a bearing bracket 61 which rises from the bottom of the casing. This rod is held against rotation by a set screw 62 passing through the bearing 61.

The sleeve 57 is integral with a yoke 66 which loosely surrounds the hub 67 of the gear 42. This yoke abuts against a shoulder of said extension, whereby upon displacement of the yoke 66 in a predetermined direction the gear 42 also will be displaced against the action of the spring 68, and will be thrown out of engagement with the gear 44. The hub extension 67 is constructed as a gear of considerably smaller diameter than the gear 42, and this gear which is integral with the gear 42 is in mesh with an idler gear or pinion 69 carried by the yoke 57. This idler gear is located so as to engage the gear 44 when the yoke is shifted whereby the rotation of said gear and the rotation of the shaft 11 and driven shaft 10 is reversed.

The yoke 66 is connected by the link 70 with another yoke 71 which is pivoted about a post 72, in the bottom with a sleeve 58 slidably of the casing. The yoke 71 is bifurcated and its pins enter the groove 27 in the hub 26 of the cup shaped member 25.

Upon swinging the pivot pin 50 the protecting bell 25 will therefore be axially displaced to surround the centrifugal members 21 and to prevent their outward movement. As long as they are prevented from flying outwardly they also are prevented from causing a longitudinal displacement of the clutch, leaving, therefore, the latter in the position indicated at Fig. 1.

Owing to the connection with the gear shifter 66 (which brings the reversing idler to operative position) with the protecting hood 25 the reversing of the drive can only be effected when the member 30 is in the position indicated in Fig. 1. The reversal at a speed different from low speed of the first step is not possible in the present drive.

It will be seen therefore that each increase of the speed with which the engine shaft rotates will be followed automatically by movement of the clutch, whereby the driven shaft is then rotated at a higher speed. It will also be seen that in this transmission from one speed to another there is an interval, the tooth 38 being unable to engage at the same time any two of the driving gear wheels 39, 40 and 41. That condition which occurs in manual change speed gears and which frequently results in the breakage of gear teeth on any one of the several gears is thereby entirely eliminated.

Fig. 9 illustrates by way of example the portions of the mechanism for operating the drive in reverse direction. The link 53, through the displacement of which the arm 52 and rock shaft 50 are operated, is connected at one end with a crank arm 80, which is rigidly mounted on a rock shaft 81, supported in brackets 82 below the driver's position. Another arm 83 is also fixed to the rock shaft 81 and has a pedal 84 projecting through the foot board within reach of the driver. This arm 83 is normally retained in a predetermined position by a spring 85.

When the driver presses on the pedal 84 the rock shaft 81 is subject to a part rotation and causes a displacement of the link 83, which leads to a swinging movement of the arm 52 and shaft 50. Upon release of the pressure the spring 85 returns the pedal and the other parts to their original position.

I claim—

1. In a change speed gear the combination of a driving shaft, an axially slidable clutch driven at a predetermined speed with respect to that of the driving shaft, a driven shaft, transmission gearing between said clutch and said driven shaft, a plurality of centrifugal members controlled by said clutch, and means on said clutch adapted to be engaged by said centrifugal members for effecting axial displacement in a predetermined direction.

2. In a change speed gear the combination of a driving shaft, a driven shaft, an axially slidable clutch driven at a predetermined ratio of speed relatively of that of the driving shaft, a plurality of centrifugal members controlled by said clutch, and in fixed speed relation to said driving shaft, and means fixed to said clutch in engagement with said centrifugal members for axially displacing said clutch.

3. In a change speed gear the combination of a driving shaft, a clutch driven at a predetermined ratio of speed by said driving shaft and movable longitudinally thereof, a plurality of centrifugal members in fixed speed relation to the driving shaft, and an element fixedly associated with said clutch for utilizing the axial component of the centrifugal force acting on said members to effect axial displacement of said clutch, a driven shaft and transmission gearing between said clutch and said driven shaft, said clutch being adapted to engage different members of said transmission gearing upon axial displacement produced by said centrifugal members.

4. In a change speed gear the combination of a driving shaft, a counter shaft driven thereby, a ring splined to the counter shaft, a plurality of centrifugal gear shifting members, a conical body fixed to said ring, and means interposed between said conical body and centrifugal members for yieldingly transmitting the rotation of the conical body to the said centrifugal members.

5. In a change speed gear the combination of a driving shaft, a shifting element rotated at a fixed ratio of speed with respect to the driving shaft, a plurality of centrifugal members driven by said shifting element, means associated with said shifting element for axially displacing said element through engagement with said centrifugal members, and means for yieldingly resisting the axial displacement.

6. In a change speed gear the combination of a driven shaft, a train of transmission gearing, a plurality of centrifugal members controlled by the driving shaft, a hollow cone, said centrifugal members projecting into said cone, and means associated with said cone for automatically altering the operative conditions of the transmission train between the driving shaft and the driven shaft.

7. In a change speed gear the combination of a driving shaft, a shiftable clutch rotated at a fixed ratio of speed with respect to the driving shaft and displaceable in axial direction, a pair of centrifugal members, and a conical element associated with the clutch and adapted to be moved in axial direction by radial pressure of centrifugal members against the same.

8. In a change speed gear the combination of a driving shaft, a counter shaft driven at a predetermined ratio of speed, a clutch on said counter shaft and axially displaceable thereon, a plurality of centrifugal members loosely rotatable on said counter shaft, a hollow cone fixedly connected with the clutch, and a yielding connection interposed between said centrifugal members and the hollow cone, said yielding connection being anchored at the narrow portion of the cone.

9. In a change speed gear the combination of a driving shaft, a counter shaft driven at a fixed ratio of speed with respect of the driving shaft, a ring held against axial displacement on the counter shaft, a plurality of centrifugal members secured to the said ring, a clutch driven by said counter shaft, a hollow cone associated with said clutch, and a connecting element between said hollow cone and said ring normally holding said ring and cone at a predetermined distance in axial direction and adapted to yieldingly transmit the rotation of said cone to said ring.

10. In a change speed gear the combination of a driving shaft, a driven shaft in alignment therewith, a counter shaft, a clutch on the counter shaft, a plurality of gears in axial alignment with the counter shaft, companion gears on the driven shaft, means dependent in their action upon centrifugal force for displacing said clutch, one of the gears on the counter shaft being associated with an idler gear, and manually controlled means for simultaneously bringing said idler gear into operative relation and preventing movement of the centrifugal members under the action of centrifugal force.

In testimony whereof, I affix my signature in the presence of two witnesses at 36 W. Randolph St., Chicago, Illinois.

EDWIN J. APPLEBERG.

Witnesses:
E. H. RIEKEN,
DANIEL A. BRENNAN.